United States Patent Office 3,767,760
Patented Oct. 23, 1973

3,767,760
PROCESS FOR RECOVERY OF PRECIOUS METALS FROM COPPER-CONTAINING MATERIALS
Leif Reidar Hougen and Hans Zachariasen, Kristiansand, Norway, assignors to Falconbridge Nickel Mines Limited, Toronto, Ontario, Canada
Filed Dec. 13, 1971, Ser. No. 207,300
Int. Cl. C01g 55/00
U.S. Cl. 423—22
10 Claims

ABSTRACT OF THE DISCLOSURE

A process for recovery of precious metal values from solid particles of sulphidic concentrates, mattes and the like containing copper is described. The process comprises, in part, the preferential leaching of copper from precious metals in the solids and the invention seeks to optimize the separation of copper from precious metals by conditioning the solids prior to preferential leaching of copper, by treating the solids as an agitated slurry in a mineral acid-bearing solution in the presence of hydrogen sulphide. Subsequent to the separation of copper from precious metals, the process further comprises removing from the leached solids the elemental sulphur generated during leaching, dissolving precious metals from the remaining solids in aqua regia, and recovering precious metal values from the solution. An advantage of the process is that all of the precious metals are rendered soluble in the aqua regia leach.

---

This invention relates broadly to recovery of metal values from solid particles, more specifically to recovery of precious metals from particles of sulphide concentrates, mattes and the like, and particularly to an improved method for recovery of the platinum group metals from such materials containing copper. Further reference to pecious metals in this specification will be made by the abbreviation PM's and this term will be understood to refer collectively to gold and the six platinum group metals, namely platinum, palladium, rhodium, ruthenium, osmium and iridium.

The platinum group metals occur in nature commonly in sulphide deposits in association with base metals, notably nickel and copper. The total concentration of PM's in different ores varies widely but at most is only a few parts per million. Prior recovery of nickel and copper is therefore the common approach to recovery of PM's from such ores, regardless of their PM concentration. In general, the mineral values in the ore are first concentrated by physical means and smelted to a matte. In treating the matte for recovery of nickel and copper, other base metals, notably iron, and the bulk of the sulphur are also removed. While the PM's are largely retained in the remaining solids as a PM concentrate, such concentrates still consist largely of base metals and sulphur, albeit at higher PM concentrations than that of the original matte, and thus the first stages of their treatment for PM recovery are base metal and sulphur removal, and further concentration of PM's in the progressively decreasing amount of solids. The solids are ultimately leached in aqua regia, on a relatively small batch scale, to dissolve PM's. Unfortunately, however, only some of the PM's are dissolved and thus not only the solution but also the leach residue must be further treated for recovery of PM's.

While the bulk of the PM's are believed to be present in a sulphide form in the concentrate, the incomplete leach is believed to be due largely, if not completely, to the presence of insoluble PM oxides in the concentrate resulting from high temperature oxidation, specifically roasting, to which the PM concentrates are commonly subjected during removal of base metals, notably copper. If, in addition to roasting, the matte or concentrate has been subjected, at some stage, to high temperature treatment under reducing conditions, or if there are native PM's in the original ore, it is quite possible that there would be metallic PM's in the concentrate which are not readily susceptible to acid leaching.

How the various PM's are distributed and associated in these phases and which are soluble is not precisely known, but in the aqua regia leaching of PM concentrates resulting from existing processes, only gold, platinum and palladium are dissolved to any appreciable extent, while rhodium, ruthenium, iridium and osmium remain substantially undissolved in the leach residue.

An object of the present invention is to provide a process for the treatment of PM concentrates, which is not only simpler and more efficient than existing methods but also advantageously avoids roasting and the consequent formation of PM oxides that are insoluble in aqua regia. In fact all the PM's in concentrates treated by the present process are substantially completely leached in aqua regia thereby eliminating further costly treatment of the leach residue and providing one solution from which all the PM's can be conveniently recovered.

One operation which characterizes the present process is preferential leaching of copper with respect to PM's in the concentrate, such as the chlorine leaching taught in co-pending U.S. application 125,682 filed Mar. 18, 1971. It is this step which replaces prior art means of copper separation by sulphuric acid leaching of copper oxide in a roasted concentrate which also contains PM oxides rendered insoluble in aqua regia. Following the copper leach the elemental sulphur generated by oxidation of sulphide sulphur is separated from the concentrate by any of a variety of methods and the PM's are then dissolved in aqua regia to leave a substantially barren residue.

An alternative preferential leach may be a pressure sulphuric acid leach wherein the concentrate is treated, in an autoclave, under an overpressure of oxygen. The residue again contains elemental sulphur, PM's and gangue which can be treated, by various known methods to yield sulphur and a similar final PM concentrate to that described above.

In practising preferential copper leaching according to the above-noted copending application it has been discovered that while the copper-PM separation is substantially complete with some concentrates, there is considerable PM dissolution with copper from other concentrates. Thus additional process means to ensure that copper-PM separation is substantially complete during the chlorine leaching step are necessary and form the basis of the present invention.

Thus a principal object of the present invention is to provide an improved process for recovery of PM's from sulphide PM concentrates, particularly those containing copper.

A further object of the present invention is to provide a process for the improved separation of copper from PM's in such concentrates.

The present process is applicable to the treatment of sulphidic PM concent rate particles in general, and particularly to those containing copper. According to the process of the present invention copper is removed from such particles by a preferential oxidizing leaching of copper with respect to PM's such as by the practices of the invention described in the copending U.S. application referred to above or by pressure sulphuric acid leaching with an oxygen overpressure. In either case sulphide sulphur is oxidized to elemental sulphur rather than to sulphate, and the elemental sulphur remains in the leached solids for later removal by any of a variety of known methods, and the PM's are then dissolved in aqua regia from which they can be separately recovered. The essence of the present invention is the practice of conditioning the PM concentrate particles prior to preferential leaching of copper by treating the particles in a mineral acid in the presence of hydrogen sulphide thereby increasing the separability of copper from PM's in the subsequent copper leach.

The invention will be more clearly understood by reference to the following drawings in which.

Figure 1:
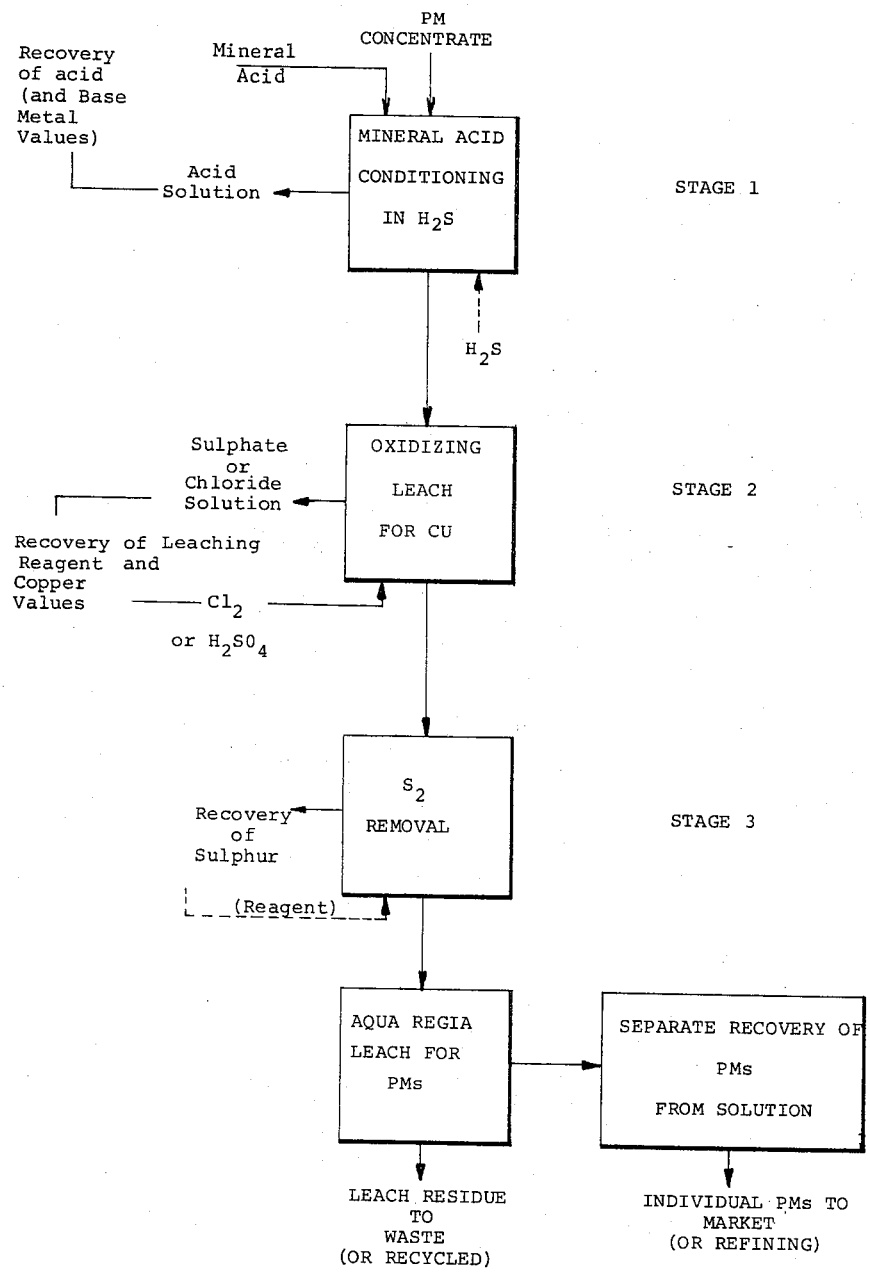
FIG. 1 is a generalized flowsheet of a process for recovering PM's from sulphide materials.

As indicated in FIG. 1 the process is distinguished by its simplicity relative to existing processes. It consists at most of three successive stages of conditioning and upgrading of a PM concentrate followed by aqua regia leaching of PM's and recovery thereof from solution, advantageously as individual metals. PM concentrate feed to the process of this invention can derive from a variety of sources and have a variety of compositions and thus the term PM concentrate is defined for purposes of this specification as any sulphidic PM-bearing material in which the value of the PM's recovered from the material exceeds the cost of treating the material for their recovery. Thus, a nickel-copper matte containing, for example, 0.002% PM's, is not a PM concentrate because the total value of the recovered PM's, assuming 100% recovery and a reasonable overall unit value of $100 per troy oz., is only about $60 per short ton of matte, an insignificant amount compared to the cost of recovering the nickel and copper alone. Upon recovery of the bulk of the nickel and copper from such a matter, however, the remaining solids can readily qualify as PM concentrate. Nickel anode slimes with a PM concentration of, say, 0.1%, for example, have a recovered PM value of about $2500 per short ton even assuming only about 80% PM recovery. Since this value exceeds the cost required to treat the slimes for such PM recovery, this and other similar materials are regarded as PM concentrates for purposes of this specification. A nickel-copper matte prepared directly from a relatively high grade PM-bearing ore, for example, and having 0.1% PM's without any prior recovery of nickel or copper, is as much a PM concentrate as nickel anode slimes recovered from lower grade PM-bearing mattes, and can be treated according to this invention in a similar manner. Other PM concentrates can derive from PM ores from which PM's are commonly recovered as relatively rich gravity concentrates and while such concentrates might not contain large or even significant concentrations of nickel, copper, or other base metals, they can nevertheless be treated for recovery of PM's advantageously according to the practice of the present invention.

Figure 2:
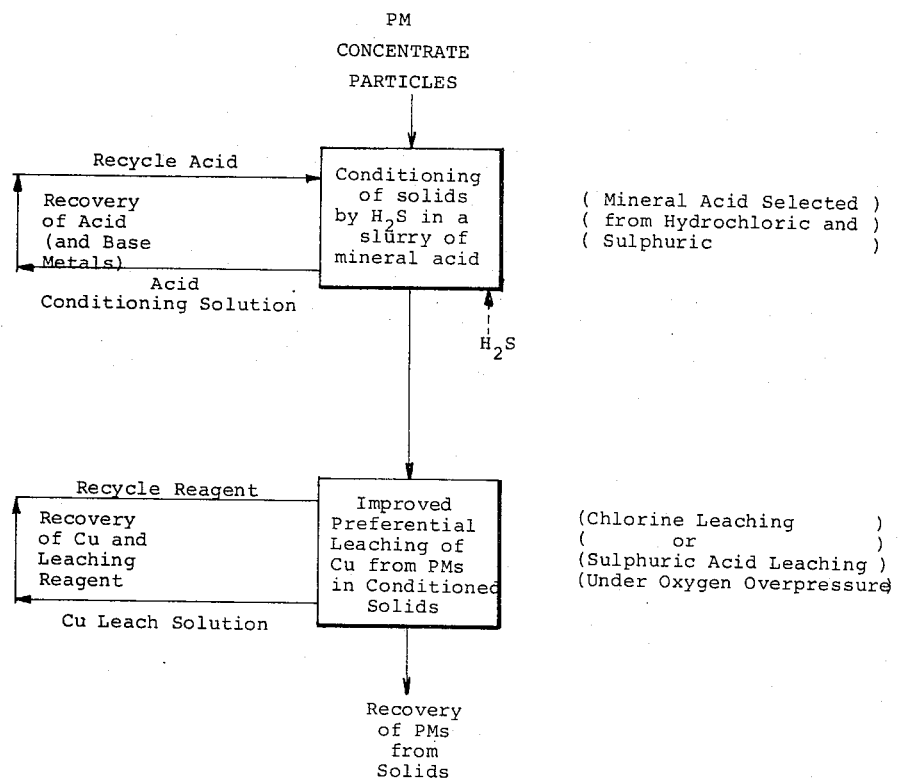
FIG. 2 is a generalized flowsheet of the process of the invention.

As shown generally in FIG. 2, the PM concentrate is first conditioned as an agitated slurry in a mineral acid such as hydrochloric acid or sulphuric acid, in the presence of hydrogen sulphide. When using the preferred hydrochloric acid, the conditioning is advantageously carried out under conditions similar to those described in U.S. Pat. 3,085,054 for HCl leaching of nickel-copper matte. Thus the concentrate is finely ground, slurried with HCl, and treated at a temperature of at least about 60° C. in the presence of $H_2S$. The $H_2S$ is provided either from an outside source or in situ upon dissolution of iron and nickel sulphides that may be present in the concentrate, or from both sources simultaneously. Copper and PM's remain substantially undissolved and therefore become concentrated in the treated solids. The source of $H_2S$ is not important. It matters only that $H_2S$ be present to ensure that substantially all the PM's and copper are found in the treated solids.

Copper and PM's are next separated, as indicated in FIGS. 1 and 2, by a controlled preferential oxidizing leach of the treated solids such as by the method described in the copending U.S. application referred to above, and wherein the solids and chlorine gas are fed to an agitated aqueous slurry containing cuprous ions at a carefully controlled redox potential. The redox potential of the slurry increases upon feeding chlorine and decreases on feeding the particulate solids, so that by controlling the rate at which the solids are fed relative to the rate at which chlorine is fed, it is possible to maintain the redox potential at or below the selected potential at which copper is leached from the solids preferentially to PM's. It is during this stage that the advantageous effect of the preceding acid-$H_2S$ treatment on the PM's becomes evident. Separation of copper from PM's by chlorine leaching of sulphidic materials is best effected at a redox potential between about 450 mv. and about 500 mv. with respect to Pt-calomel electrodes, and it has been discovered that when the PM concentrate is first treated with acid-$H_2S$ as described, separation of copper from PM's during subsequent chlorine leaching is substantially complete. Thus the PM's remain, as in the first stage, in the leach residue, and of course at an even higher level of concentration. In the absence of the acid-$H_2S$ treatment, on the other hand, significant dissolution of PM's can occur along with the copper. Further reference herein to redox potentials will be understood to relate to Pt-saturated calomel electrodes.

As an alternative to the chlorine leach, and as indicated in FIG. 2, the treated solids may be subjected to another oxidizing leach such as pressure leaching with $H_2SO_4$-containing liquors, in the presence of an oxygen overpressure to oxidize sulphide sulphur to elemental sulphur. The redox potential of the agitated leach slurry is controlled, as referred to above, to between about 450 mv. and 500 mv. and the temperature is maintained below about 90° C. to prevent melting of the elemental sulphur produced. A characteristic oxygen overpressure is in the order of about 10 atmospheres.

The third stage, as shown in FIG. 1, results in further concentration of PM's by removal, from the oxidizing leach residue, of elemental sulphur formed during the oxidizing leach. This separation can be effected by various methods, as indicated in the co-pending U.S. application referred to above. The most satisfactory methods are characterized by gentle treatment conditions in which elemental sulphur is coaxed from the solids at low temperatures or by dissolution in highly selective solvents, thereby leaving the PM's at a high level of concentration in the solids, and avoiding changes in their condition that might result from more severe treatments such as high temperature roasting.

The high-grade PM concentrate resulting from removal of the bulk of the base metals and their associated sulphur in the original concentrate by the above three treatment stages, is next leached in aqua regia and advantageously all the PM's are substantially completely dissolved. The solution is then treated for recovery of PM's therefrom.

As mentioned earlier, practice of the above process without the initial acid-$H_2S$ conditioning step can lead in the treatment of some PM concentrates, to dissolution of PM's during the following preferential oxidizing leach for copper. The reasons why PM's in some concentrates are more soluble in the copper leach than those in others, and what the acid-$H_2S$ treatment does to the latter to render the PM's less soluble are not understood. It is suggested, however, that the answer may be associated with the initial presence of PM's in some concentrates in metallic form which become converted to sulphide form during the acid-$H_2S$ conditioning step. Such an effect could account for the improved separability of copper from PM's by an oxidizng leach following the acid-$H_2S$ treatment because, as explained in the co-pending U.S. application cited above, separation of copper sulphide from PM's by chlorine leaching is greater when the PM's are in sulphidic rather than metallic form. That PM's may exist in metallic as well as sulphidic form in concentrates resulting from the treatment of nickel and copper ores for recovery of the nickel and copper, is understandable in view of the treatments to which such ores are subject in recovering the nickel and copper.

In smelting such an ore to matte, for example, some of the nickel and copper is generally present in metallic form, and since the PM's associate with nickel and copper, it is reasonable to expect that, under conditions wherein metallic nickel and copper exists, metallic PM's will also be present in the concentrates resulting from recovery of nickel and copper from such matte. Whether such metallic PM's are converted to sulphide form by the acid-$H_2S$ treatment, and if so how the conversion occurs, is not understood, but the surprising fact remains that PM values in the concentrate that are soluble when the concentrate is treated directly for copper removal by selective copper leaching, are rendered insoluble under the same conditions by preconditioning of the concentrate particles in the acid-$H_2S$ treatment, so that substantially all of the PM's are contained in the insoluble residue after preferential oxidizing leaching.

Another great advantage of the acid-$H_2S$ step of the present process is that nickel, and other base metals, such as iron, that are less noble than copper, are dissolved and thereby effectively separated from the copper which remains in the concentrate with the PM's for separate recovery in the subsequent copper leach step. Moreover, the presence of base metals such as nickel and iron in the concentrate decreases or eliminates the need for any outside source of $H_2S$ for the acid-$H_2S$ treatment because $H_2S$ is generated in situ by the dissolution of soluble base metal sulphides.

A further advantage of the acid-$H_2S$ treatment relates to the aqua regia leach. Because it is possible, according to existing processes, to have PM's in both metallic and oxidic as well as sulphidic form in the PM concentrates before aqua regia leaching, it is possible that the observed PM insolubility is due, at least in part, to metallics as well as to oxides. If this is the case then practice of the present invention is an advantage even if the original PM concentrates contain no base metals, because in the present process, the initial acid $H_2S$ conditioning step appears to convert the metallics to sulhides and hence all the PM's are substantially completely dissolved in aqua regia. While a PM concentrate devoid of base metals is perhaps unlikely, the example nevertheless serves to emphasize the nature, effect and application of the invention.

Further illustration of the nature and value of the invention is provided by the following examples.

EXAMPLE 1

This example illustrates what can happen when a PM concentrate is treated by the present process but without the initial acid-$H_2S$ conditioning step. The PM concentrate in this particular case was obtained from a nickel-copper matte from which the bulk of the nickel and copper had already been recovered. The nickel was recovered by electrorefining of soluble nickel anodes, the nickelanode slimes were melted to produce a new anode which was in turn electrolyzed to recover further nickel, and the resulting new anode slimes constituted the PM concentrate of this example. The concentrate analyzed approximately in wt. percent:

| Cu | Ni | Fe | Co | S | SiO$_2$ | PM's |
|----|----|----|----|----|---------|------|
| 49 | 5  | 4  | 1  | 16 | 25      | 2    |

This concentrate was chlorine-leached under redox control, according to the practice of the invention described in the co-pending U.S. application 125,682, to dissolve base metals selectively with respect to PM's. The redox potential was maintained at about 450 mv. under which conditions PM's in other concentrates of similar compositions have been shown to remain substantially completely undissolved in the chlorine leach residue. In this case, however, the following percentage dissolutions occurred.

| Au | Pt  | Pd  | Rh | Ru | Ir |
|----|-----|-----|----|----|----|
| <1 | 1.3 | 1.0 | 11 | 30 | 20 |

EXAMPLE 2

A similar result to that of Example 1 was obtained when a similar PM concentrate to that of Example 1 was roasted and hydrogen-reduced before being chlorine-leached under similar conditions to those of Example 1. In this case the PM concentrate was roasted at 750° C. and hydrogen-reduced at 500° C. to produce a material of the following composition in wt. percent:

| Cu | Ni | Fe | S | PM's |
|----|----|----|---|------|
| 71 | 8  | 3  | 2 | 1.6  |

This material was chlorine-leached at several redox potentials with the following percentage dissolutions of the various PM's:

| Redox, mv. | Au   | Pt    | Pd   | Rh  | Ru  | Ir |
|------------|------|-------|------|-----|-----|----|
| 450        | 0.03 |       | <0.1 | 3.7 | 0.9 | 2  |
| 475        | 0.09 | 0.05  | <0.1 | 4.8 | 1.4 | 4  |
| 500        | 0.07 | <0.07 | <0.1 | 8.0 | 8.2 | 8  |

Thus while gold, platinum and palladium remained substantially undissolved, there was considerable dissolution of the other platinum group metals even at 450 mv. Since it is likely that this concentrate contained PM values in metallic form as a result of the reduction treatment, it is reasonably inferred that the similar dissolution pattern of PM's in Example 1 was due at least in part of the presence of PM's in the concentrate in metallic form.

EXAMPLE 3

In contrast to the above examples, a quite different result was obtained when a concentrate similar to those above was smelted to a matte before chlorine-leaching The PM concentrate in this case had the following analysis in wt. percent:

| Cu | Ni | Fe | S  | SiO$_2$ | PM's |
|----|----|----|----|---------|------|
| 46 | 8  | 4  | 14 | 8       | 1.2  |

This concentrate was smelted with iron sulphide and borax and the resulting matte had the following composition in wt. percent:

| Cu | Ni | Fe | S  | SiO$_2$ | PM's |
|----|----|----|----|---------|------|
| 54 | 7  | 4  | 20 | <1      | 1.6  |

Chlorine leaching of this PM matte was carried out at redox potential of 475 mv.

The percentage dissolutions of the various PMs were as shown below:

| Au   | Pt   | Pd   | Rh   | Ru  | Ir |
|------|------|------|------|-----|----|
| <0.1 | <0.1 | <0.1 | <0.1 | 0.4 | -- |

Dissolution of gold, platinum and palladium was again substantially negligible as in Example 2, but the remarkable fact was that rhodium and ruthenium also remained substantially undissolved. If the dissolution of rhodium and ruthenium in the previous cases was due at least in part to their presence in the concentrates in metallic form, then their lack of solubility in the present case was due presumably to their conversion to sulphide form by the matte smelting procedure. Thus it appears that to prevent dissolution of PM's upon chlorine leaching of concentrates it is necessary to ensure that PM's are present in the concentrates in sulphide form. Whether this is the case or not, the fact remains that PM's can be substantially prevented from dissolving during chlorine leaching advantageously according to the practice of the present invention, as illustrated in the following examples.

EXAMPLE 4

The PM concentrate in this case was again derived from the same source and had a similar composition to those of the previous examples as shown by the analysis below in wt. percent.

| Cu | Ni | Fe | S | $SiO_2$ | PM's |
|---|---|---|---|---|---|
| 52 | 4 | 4 | 17 | 12 | 1.6 |

Instead of direct chlorine leaching, or roasting reduction or matte smelting prior to chlorine leaching the concentrate in this case was first conditioned in HCl in the presence of $H_2S$ according to the teachings of this invention.

An agitated slurry of 200 g./l. concentrate in a solution containing initially 280 g./l. HCl was treated for 20 hours at 65° C. in the presence of $H_2S$ that was bubbled into the slurry at a rate of about 10 ml./min. Nickel and iron were dissolved while the bulk of the copper and substantially all the PM's remained in the solids as shown by the percentage dissolutions below:

| Cu | Ni | Fe | Au | Pt | Pd | Rh | Ru | Ir |
|---|---|---|---|---|---|---|---|---|
| 3 | 61 | 73 | <0.05 | <0.07 | <0.07 | <0.1 | <0.35 | <0.1 |

The solids were then chlorine-leached for separation of copper from PM's. An agitated slurry of 100 g./l. solids in a solution containing initially 20 g./l. HCl and 5 g./l. cuprous copper was treated for about 4.5 hours at 97° C. as $Cl_2$ was bubbled therethrough at 80 ml./min., and the redox potential was held to a maximum of 475 mv.

About 90% of the base metals were dissolved while again the PM's remained substantially completely in the solids as shown by the approximate percentage dissolutions below:

| Cu | Ni | Fe | Au | Pt | Pd | Rh | Ru | Ir |
|---|---|---|---|---|---|---|---|---|
| 95 | 85 | 90 | 0.1 | 0.07 | 0.07 | 0.2 | 1.0 | 0.3 |

The residue remaining at this stage weighed about 30% that of the original PM concentrate and had the following approximate composition in wt. percent:

| Cu | Ni | Fe | S | Au | Pt | Pd | Rh | Ru | Ir | Total PM's |
|---|---|---|---|---|---|---|---|---|---|---|
| 10 | 1 | 0.5 | 42 | 0.6 | 1.9 | 1.8 | 0.7 | 0.4 | 0.3 | 5.7 |

Elemental sulphur in this material was removed, in this instance, by reaction with sodium sulphide in aqueous solution to form sodium thiosulphate. An agitated suspension of the solids in the solution was maintained for several hours at 65° C. with about 10% excess sodium sulphite. The final pH was 7.5. Slight dissolution of PM's occurred but upon separation of the solids, the solution was acidified and the bulk of the dissolved PM's precipitated by the reducing action of $SO_2$ generated by reaction of the acid with the excess sodium sulphite. Thus the solids remaining after sulphur removal contained substantially all the PM's and had the following approximate composition in wt. percent:

| Cu | Ni | Fe | S | $SiO_2$ | Au | Pt | Pd | Rh | Ru | Ir | Total PM's |
|---|---|---|---|---|---|---|---|---|---|---|---|
| 12 | 2 | 1 | 10 | 31 | 1.0 | 3.8 | 3.2 | 1.2 | 0.7 | 0.6 | 10.7 |

This material was next leached in aqua regia and dissolution of PM's was substantially complete as shown by the following remarkable percentage dissolution figures for the various PM's:

| Au | Pt | Pd | Rh | Ru | Ir |
|---|---|---|---|---|---|
| 99.0 | 99.0 | 99.0 | 95.0 | 98.0 | 94.0 |

The residue resulting from PM dissolution had the following composition in wt. percent:

| Cu | Ni | Fe | $SiO_2$ | Au | Pt | Pd | Rh | Ru | Ir |
|---|---|---|---|---|---|---|---|---|---|
| 0.1 | 0.7 | 1.3 | 60.0 | 0.03 | 0.11 | <0.1 | <0.2 | <0.03 | <0.1 |

This residue was recycled for preparation of fresh quantities of PM concentrate, and the dissolved PM's were recovered independently from solution by known procedures.

Thus a concentrate containing PM values that has been shown to dissolve readily during the selective chlorine leach for copper, was advantageously conditioned by subjection to the practice of the present invention so that the same PM values were rendered insoluble under the conditions of the selective chlorine leach for copper. They were also substantially completely soluble in the aqua regia leach. As a result of this remarkable effect the present process for recovery of PM's from concentrates is much simpler and more efficient than existing processes and is also broadly applicable to PM concentrates from a variety of sources as illustrated by the following example:

EXAMPLE 5

The PM concentrate in this case was recovered directly from a PM ore as a nickel-copper matte with the following composition in wt. percent:

| Ni | Cu | Fe | S | PM's |
|---|---|---|---|---|
| 37 | 20.5 | 9.9 | 27.0 | ~0.1 |

The matte was ground to —100 mesh, added slowly at a rate of 10 g. per minute to a leach solution that contained 280 g./l. HCl and 30 g./l. Ni, and reacted under agitation at 60° C. and a concentration of 200 g. of matte per litre of solution. $H_2S$ was produced in situ by dissolution of nickel and iron in the matte and the leach was continued until substantially all the nickel and iron and about 75% of the matte were dissolved. The percentage dissolutions of the various metals are shown below:

| Ni | Cu | Fe | Au | Pt | Pd | Rh | Ru | Ir |
|---|---|---|---|---|---|---|---|---|
| 99.8 | 1.0 | 99 | 0.4 | 0.2 | <0.5 | 0.8 | <0.5 | <1 |

Substantially all the copper and PM's were undissolved. The composition of the remaining solids was, in wt. percent:

| Ni | Cu | Fe | S | PM's |
|---|---|---|---|---|
| 0.7 | 73.2 | 0.5 | 18.6 | ~0.4 |

These solids were next chlorine-leached at a concentration of 100 g./l. as an agitated slurry with a solution containing 50 g./l. Ni, 50 g./l. HCl and 5 g./l. cuprous copper. Chlorine was fed into the slurry at a rate of 70 ml./min., the temperature was controlled at 100° C. and redox potential was controlled to 430 mv.

About 77% of the solids were dissolved and percentage dissolutions of the various metals were as shown below:

| Cu | Ni | Fe | Au | Pt | Pd | Rh | Ru | Ir |
|---|---|---|---|---|---|---|---|---|
| 99 | 25 | 50 | <0.2 | <0.1 | <0.5 | 0.8 | 1.0 | — |

At this stage substantially all the copper was dissolved but again the PM's remained almost completely in the solid phase which had the following composition in wt. percent:

| Cu | Ni | Fe | S | PM's |
|---|---|---|---|---|
| 0.7 | 1.4 | 1.0 | 77 | ~1.7 |

About 85% of the sulphur was present in elemental form and was removed in carbon disulphide at 20° C. without loss of PM's, and an overall weight decrease of about 78%.

The resulting solids were then leached in aqua regia with the following percentage dissolutions of the PM's

| Au | Pt | Pd | Rh | Ru | Ir |
|---|---|---|---|---|---|
| >99 | >97 | >98 | 98 | >98 | >90 |

The aqua leach residue weighed only about 0.5% that of the original PM concentrate and had the following PM content in wt. percent:

| Au | Pt | Pd | Rh | Ru | Ir |
|---|---|---|---|---|---|
| <0.01 | <0.03 | <0.1 | 0.2 | <0.03 | <0.1 |

This residue, consisting almost entirely of $SiO_2$ and other gangue material, can be conveniently returned for preparation of further quantities of PM concentrate. The progress and results of the treatment as described in this example are essentially similar to those of the previous example although the starting PM concentrates in both cases were derived from different sources, were prepared by different methods, and were considerably different in composition.

EXAMPLE 6

The effect of the acid-$H_2S$ pretreatment on the dissolution of PM's during subsequent copper leaching is demonstrated by the following three pairs of runs made with different PM concentrates of differing sulphur concentrations. One run of each pair was a direct $Cl_2$ leach without prior conditioning, while the other was a $Cl_2$ leach following a prior HCl-$H_2S$ preleach. The first two PM concentrates referred to below were similar to those described in Examples 1 to 4, while the third concentrate was a low-sulphur fraction of a PM matte similar to that referred to in Example 5. The HCl-$H_2S$ and $Cl_2$ leaches were all carried out under conditions similar to those described previously, the $Cl_2$ leach at a redox potential of 450 mv. in all cases. The dissolutions of PM's upon $Cl_2$ are tabulated below.

| PM concentrate | | Percent S | Leach treatment | Dissolution of PM's upon $Cl_2$ leaching, percent | | | | | |
|---|---|---|---|---|---|---|---|---|---|
| No. | Similar to— | | | Au | Pt | Pd | Rh | Ru | Ir |
| 1 | Examples 1-4 | 19.8 | Direct $Cl_2$ | <0.01 | 1.04 | 0.05 | 0.6 | 2.1 | 3.0 |
|   |              |      | Prior HCl-$H_2S$ | <0.02 | 0.04 | 0.08 | 1.0 | 1.4 | 1.3 |
| 2 | Examples 1-4 | 13.6 | Direct $Cl_2$ | <0.04 | <0.02 | 0.08 | 2.1 | 17.5 | 16.7 |
|   |              |      | Prior HCl-$H_2S$ | 0.02 | 0.02 | 0.03 | 0.5 | 2.3 | 1.5 |
| 3 | Example 5    | 14.2 | Direct $Cl_2$ | 0.3 | 0.04 | 0.02 | 49 | 27 | 25 |
|   |              |      | Prior HCl-$H_2S$ | 0.3 | 1.2 | 1.2 | <3.3 | 1.7 | 1.6 |

Thus it is clear that while the dissolutions of Au, Pt and Pd were negligible in all cases, those of Rh, Ru and Ir were significant upon direct $Cl_2$ leaching particularly for No.'s 2 and 3, and were decreased dramatically by the prior HCl-$H_2S$ leach, particularly for No.'s 2 and 3. Because these were both relatively low-sulphur-bearing materials and therefore presumably contained correspondingly more metallics, the data are consistent with the earlier hypothesis that PM's present in the metallic state would be expected to exhibit greater tendency to dissolve during $Cl_2$ leaching than those present as sulphides and that the effect of the acid-$H_2S$ treatment in decreasing PM dissolution upon subsequent $Cl_2$ leaching is due to the unexplained conversion of such metallics to sulphide form. Thus the HCl-$H_2S$ treatment had less effect on the behaviour of concentrate No. 1 during $Cl_2$ leaching than on that of No. 2 or 3 because a higher proportion of the PM's was in sulphide form to begin with in No. 1 than in No. 2 or 3. Thus the HCl-$H_2S$ treatment as practised according to the teaching of this invention has a profound effect on the optimum separation of Cu from PM's than can be effected in most concentrates by copper leaching at controlled redox potential.

EXAMPLE 7

This example illustrates the effect of practising the invention when the copper-PM separation is made by sulphuric acid leaching under an oxygen overpressure rather than by chlorine leaching as described in the earlier examples. Thus a PM concentrate similar to those of Examples 1 to 4 was pressure sulphate leached, both with and without prior conditioning with $H_2S$, by a batch technique in which about 500 g. of solids were slurried in 4 litres of solution initially containing 150 g./l. $H_2SO_4$ and treated under an oxygen pressure of 10 atmospheres at a tempeatures below 90° C. to avoid melting the elemental sulphur generated by the leaching reactions. The initial redox potential was about 200 mv. and rose gradually as leaching occurred. When the redox reached about 480 mv. leaching was stopped and the leached solids were separated from the leach solution.

Analyses of the unconditioned and conditioned PM concentrates in wt. percent are compared below:

|  | Cu | Ni | Fe | S | PM's |
|---|---|---|---|---|---|
| Unconditioned PM conc | 57.7 | 3.0 | 2.6 | 15.9 | 1.65 |
| Conditioned PM conc | 71.0 | <0.5 | 0.3 | 22.0 | 1.93 |

Conditioning of the original concentrate with $H_2S$ was effected in a hydrochloric acid-bearing solution which accounts for the leaching of iron and nickel indicated by the above analyses.

The percentage proportions of the metals leached from both these materials by the pressure sulphate leach are shown below:

|  | Cu | Ni | Fe | Au | Pt | Pd | Rh | Ru | Ir |
|---|---|---|---|---|---|---|---|---|---|
| Unconditioned PM conc | 99 | 74 | 77 | <0.04 | <0.04 | <0.04 | 3 | 10 | 9 |
| Conditioned PM conc | 99 | 97.5 | 97 | <0.02 | <0.03 | <0.04 | 1 | 7 | 2.5 |

Thus it is clear that the conditioning treatment resulted in a marked decrease in the dissolution of PM's particularly that of Rh, Ru and Ir.

It will be appreciated by those familiar with PM metallurgy that preferred means are herein described, according to the present process, for recovery of PM's from concentates. A most significant difference between the present and existing processes is that selective copper leaching replaces roasting and sulphuric acid leaching as the means of separating copper from PM's. The oxidation of PM's that occurs during roasting and prevents their subsequent dissolution in aqua regia is thereby avoided and dissolution of PM's in aqua regia according to the present process is therefore substantially complete. Since some PM dissolution occurs during direct leaching of copper from some PM concentrates, however, the present invention is improved means for the application of controlled copper leaching to PM concentrates specifically to minimize or substantially eliminate such PM dissolution. Thus according to the present invention, the PM concentrate is conditioned in acid solution in the presence of $H_2S$, as described above, and PM dissolution upon subsequent oxidizing leaching for copper is thereby advantageously and surprisingly decreased if not substantially eliminated.

What is claimed is:

1. In a process for recovering precious metal from precious metal-bearing mattes and sulphide concentrates containing copper by treating the solids as an agitated slurry in an aqueous oxidizing leach solution in which metal is dissolved and sulphide sulphur is oxidized to elemental sulphur, the improvemnet for separating copper from PMs comprising,
    (i) conditioning the solids prior to leaching by treating the solids as an agitated slurry in a mineral acid-bearing solution in the presence of hydrogen sulphide,
    (ii) treating the conditioned solids as an agitated slurry in said oxidizing leach solution at selected redox potential below 550 mv., thereby improving the separation of copper from precious metals over that which occurs under similar redox conditions in the absence of prior conditioning of the solids.

2. A process according to claim 1 in which the mineral acid is selected from hydrochloric acid and sulphuric acid.

3. A process according to claim 2 in which the mineral acid is hydrochloric acid present in the conditioning solution in excess of that required to leach all acid-soluble constituents of the solids.

4. A process according to claim 3 in which the particulate solids are matte containing base metal selected from nickel and iron and such base metal is leached from the solids during treatment thereof in the hydrochloric acid-bearing solution while copper remains in the solids, thereby separating copper from other base metal in the matte while simultaneously conditioning the solids for subsequent separation of copper from precious metal therein.

5. A process according to claim 1 wherein treating the solids as an agitated slurry in an aqueous oxidizing leach solution comprises,
   (i) chlorine leaching the conditioned solids as an agitated slurry in a cuprous ion-bearing chloride solution, the redox potential of which increases upon feeding chlorine thereto and decreases upon feeding the solids thereto, and
   (ii) controlling the redox potential by controlling the rate of feeding chlorine relative to the rate of feeding solids to the slurry.

6. A process according to claim 5 in which the particulate solids are matte containing at least one additional base metal selected from nickel and iron, the mineral acid is hydrochloric acid present in the conditioning solution in excess of that required to leach all acid-soluble constituents of the solids, and said additional base metal is leached by the hydrochloric acid while copper remains in the solids, thereby separating copper from said additional base metal while simultaneously conditioning the solids for subsequent separation of copper from precious metals therein.

7. A process according to claim 6 and further comprising,
   (i) separating leached solids from the oxidizing leach solution,
   (ii) removing elemental sulphur from the leached solids thereby further concentrating precious metal in the remaining solids,
   (iii) leaching the remaining solids in aqua regia thereby dissolving precious metal, and
   (iv) recovering the dissolved precious metal.

8. A process according to claim 1 in which said oxidizing leach comprises,
   (i) sulphate leaching the conditioned solids as an agitated slurry in a sulphur acid-bearing solution under an overpressure of oxygen.

9. A process according to claim 8 in which the particulate solids are matte containing at least one additional base metal selected from nickel and iron, the mineral acid is hydrochloric acid present in the conditioning solution in excess of that required to leach all acid-soluble constituents of the solids, and said additional base metal is leached by the hydrochloric acid while copper remains in the solids, thereby separating copper from said additional base metal while simultaneously conditioning the solids for subsequent separation of copper from precious metals therein.

10. A process according to claim 9 and further comprising,
    (i) separating leached solids from the oxidizing leach solution.
    (ii) removing elemental sulphur from the leached solids thereby further concentrating precious metal in the remaining solids
    (iii) leaching the remaining solids in aqua regia thereby dissolving precious metal, and
    (iv) recovering the dissolved precious metal.

References Cited
UNITED STATES PATENTS

| | | | |
|---|---|---|---|
| 3,652,265 | 3/1972 | Marschik et al. | 75—117 |
| 3,117,860 | 1/1964 | Bjerkeind et al. | 75—117 X |
| 2,863,762 | 12/1958 | Pullen | 75—121 |
| 3,293,027 | 12/1966 | Mackin et al. | 75—101 |
| 2,829,967 | 4/1958 | Schlaht | 75—121 X |
| 1,315,660 | 9/1919 | Ferguson | 423—22 |

FOREIGN PATENTS

| | | | |
|---|---|---|---|
| 1,038,763 | 9/1958 | Germany | 75—101 R |

HERBERT T. CARTER, Primary Examiner

U.S. Cl. X.R.

75—101 R, 121; 204—111; 423—27, 38